United States Patent [19]

Tamai et al.

[11] Patent Number: 5,303,159
[45] Date of Patent: Apr. 12, 1994

[54] NAVIGATION SYSTEM WITH OFF-ROUTE DETECTION AND ROUTE RECALCULATION

[75] Inventors: Haruhisa Tamai, Sunnyvale, Calif.; Tatsuhiko Abe, Tsurugashima, Japan

[73] Assignee: Zexel Corporation Daihatsu-Nissan, Tokyo, Japan

[21] Appl. No.: 869,141

[22] Filed: Apr. 14, 1992

[51] Int. Cl.$^5$ .............................. G06F 15/50
[52] U.S. Cl. ............................. 364/449; 364/444; 340/990; 340/995
[58] Field of Search .............. 364/443, 444, 449; 73/178 R; 340/988, 990, 995

[56] References Cited

U.S. PATENT DOCUMENTS

| | | | |
|---|---|---|---|
| 4,774,671 | 9/1988 | Itoh et al. | 340/988 |
| 4,814,989 | 3/1989 | Döbereiner et al. | 340/988 |
| 4,926,336 | 5/1990 | Yamada | 340/990 |
| 4,989,151 | 1/1991 | Nuimura | 364/449 |
| 5,031,104 | 7/1991 | Ikeda et al. | 340/990 |
| 5,109,344 | 4/1992 | Kakihara et al. | 364/444 |
| 5,159,556 | 10/1992 | Schorter | 364/443 |
| 5,168,452 | 12/1992 | Yamada et al. | 364/449 |
| 5,184,303 | 2/1993 | Link | 364/444 |

*Primary Examiner*—Gary Chin
*Attorney, Agent, or Firm*—Thomas R. Morrison; Harold R. Burstyn

[57] ABSTRACT

A vehicle navigation system computes an optimal route for a journey. When the system detects that a vehicle has deviated from the optimal route, information that tells the driver of the deviation of the vehicle is displayed. When the driver turns on a recomputation command switch after reading the information, a new optimal route is computed, with the vehicle's present location as the new starting point. If the vehicle deviates again after computation of the new optimal route, another new optimal route is automatically recomputed, again with the vehicle's present location as the new starting point. The driver is thus freed from having to initiate the recomputation manually.

12 Claims, 3 Drawing Sheets

NAVIGATION SYSTEM WITH OFF-ROUTE DETECTION AND ROUTE RECALCULATION

BACKGROUND OF THE INVENTION

The present invention relates to a vehicle navigation system, and, more particularly, to a system for computing an optimal route from a starting point to a destination and for guiding a vehicle according to the computed optimal route.

Generally, a vehicle navigation system computes the optimal route to a destination before the vehicle starts its journey. En route, the system computes local directions along the optimal route with reference to the vehicle's present location in real time. The system guides the vehicle's navigation from a starting point to the destination by displaying route information in real time on a display device.

When a vehicle travels, it sometimes deviates from the optimal route. For example, assume a vehicle is traveling on a road in a particular direction. A route guidance display instructs the driver to turn right where the road he is on intersects a second road at right angles. However, the driver cannot make the turn because the second road is under construction. In such a case, the driver is forced to travel straight along the road he is on, without turning to the right at the next intersection. Thus the vehicle has deviated from the optimal route.

Under such circumstances, conventional navigation systems require a manual operation to recompute a new optimal route from a new starting point to the destination. The recomputation takes the vehicle's present location at the time of the manual operation as the starting point.

Conventional navigation systems sometimes require repetitive, continuous operations in order to recompute the optimal route.

Computation of an optimal route generally requires several seconds. Therefore, when a vehicle keeps on traveling after it has deviated, it moves forward by distance L from the new starting point during the time the new optimal route is computed, where L is given by the equation $$L = V \times T,$$

where V = the velocity of the vehicle and T = the time to compute the new optimal route.

Should the recomputed optimal route require a right turn at a second intersection where the road currently traveled intersects a third road, the vehicle has passed through the second intersection if the distance between the first and second intersections is shorter than the distance L. As a result, the vehicle is once more off the optimal route, which must be again recomputed in response to a manual operation by the driver. This is a great inconvenience for the driver.

OBJECTS AND SUMMARY OF THE INVENTION

An object of the present invention is to provide a navigation system that overcomes the drawbacks of the prior art.

A further object of the present invention is to provide a system that automatically activates the recomputation of an optimal route in response to a second deviation, once a first recomputation of an optimal route has been activated manually after a deviation from the original optimal route, thereby freeing the driver from the burden of repeated manual operations.

Briefly stated, the present invention provides a vehicle navigation system that computes an optimal route for a journey. When the system detects that a vehicle has deviated from the optimal route, information that tells the driver of the deviation of the vehicle is displayed. When the driver turns on a recomputation command switch after reading the information, a new optimal route is computed, with the vehicle's present location as the new starting point. If the vehicle deviates again after computation of the new optimal route, another new optimal route is automatically recomputed, again with the vehicle's present location as the new starting point. The driver is thus freed from having to initiate the recomputation manually.

According to an embodiment of the invention, a vehicle navigation system comprises: means for storing and retrieving a plurality of map data, first means for detecting a present location of the vehicle, means for computing from the map data an optimal route for the vehicle from a starting point to a destination, the means for computing including means for computing local navigation guidance from the map data, second means for detecting deviation of the vehicle from the optimal route, first means for determining whether the deviation is a first deviation, second means for determining whether the deviation is a deviation subsequent to the first deviation, third means for determining whether the deviation is a deviation subsequent to a recomputation of an optimal route, means for displaying that the vehicle has deviated from the optimal route, the means for displaying further including means for displaying local navigation guidance, the local navigation guidance being displayed when the first means for determining determines that the deviation is the first deviation, means for commanding a recomputation from the map data of a new optimal route from a new starting point to a destination, the new starting point being the present location as detected by the first means for detecting, and, when the first means for determining determines that a deviation has been detected after a command from the means for commanding has caused recomputation of a new optimal route, the computing means computes, from the map data, a new optimal route from a new starting point to a destination, using, as the new starting point, the present location as detected by the first means for detecting.

According to a feature of the invention, a vehicle navigation system comprises: a CD ROM for storing and retrieving a plurality of map data, a distance sensor, a terrestrial magnetism sensor, the distance sensor and the terrestrial magnetism sensor cooperating to detect a present location of a vehicle, a microcomputer for computing from the map data an optimal route for the vehicle from a starting point to a destination, the microcomputer effective to compute local navigation guidance from the map data, the distance sensor, the terrestrial magnetism sensor, and the microcomputer cooperating to detect a deviation of the vehicle from the optimal route, the microcomputer further determining whether the deviation is a first deviation, the microcomputer still further determining whether the deviation is a deviation subsequent to a recomputation of an optimal route, a CRT display effective to convey information that the vehicle has deviated from the optimal route, the information being displayed when the microcomputer determines that the deviation is the first deviation, the CRT display further effective to display local navigation guidance, a manually operated recomputation command switch for commanding computation of an optimal route, the recomputation command switch being effective to command the microcomputer to compute, from the map data, a new optimal route from a new starting point to a destination, the new starting point being the present location as detected by the distance sensor and the terrestrial magnetism sensor in cooperation, and, when the microcomputer determines that a deviation has been detected after a command from the recomputation command switch has caused recomputation of an optimal route, the microcomputer computes, from the map data, a new optimal route from a new starting point to a destination, using, as the new starting point, the present location as detected by the distance sensor and the terrestrial magnetism sensor in cooperation.

The above, and other objects, features, and advantages of the present invention will become apparent from the following description read in conjunction with accompanying drawings, in which like reference numerals designate the same elements.

BRIEF DESCRIPTION OF THE DRAWINGS

FIG. 3 shows information displayed on the screen of the display.

DETAILED DESCRIPTION OF THE PREFERRED EMBODIMENTS

Figure 1:
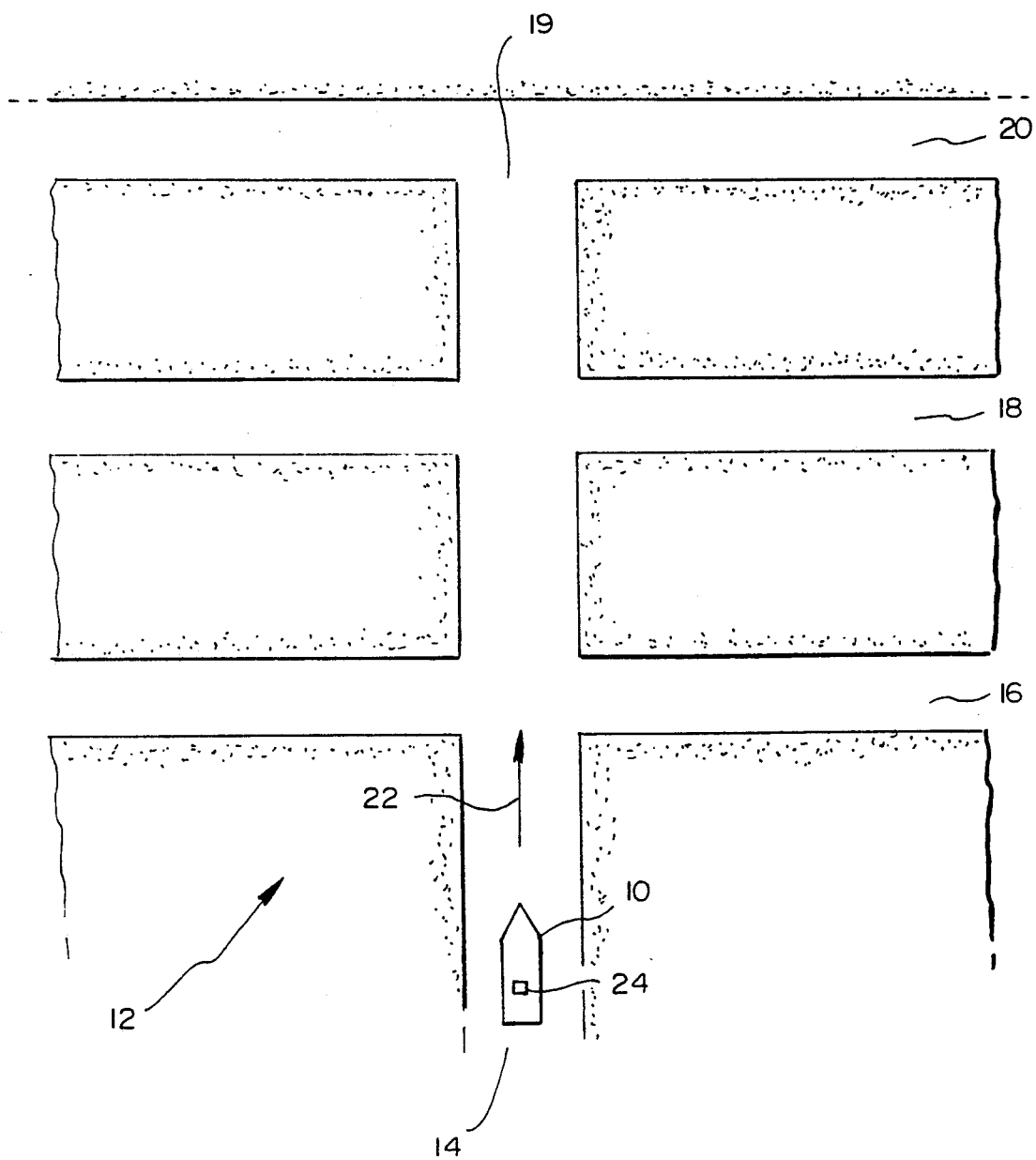
FIG. 1 is a simplified plan view of a vehicle moving over a road network. The vehicle has installed a navigation system of the present invention.

Referring to FIG. 1, a vehicle 10 moves over a road network 12, consisting of a plurality of roads 14–20, in the direction shown by an arrow 22. Road 14 intersects road 20 at intersection 19. Vehicle 10 has installed therein a navigation system 24 that contains the apparatus of the present invention.

Figure 2:
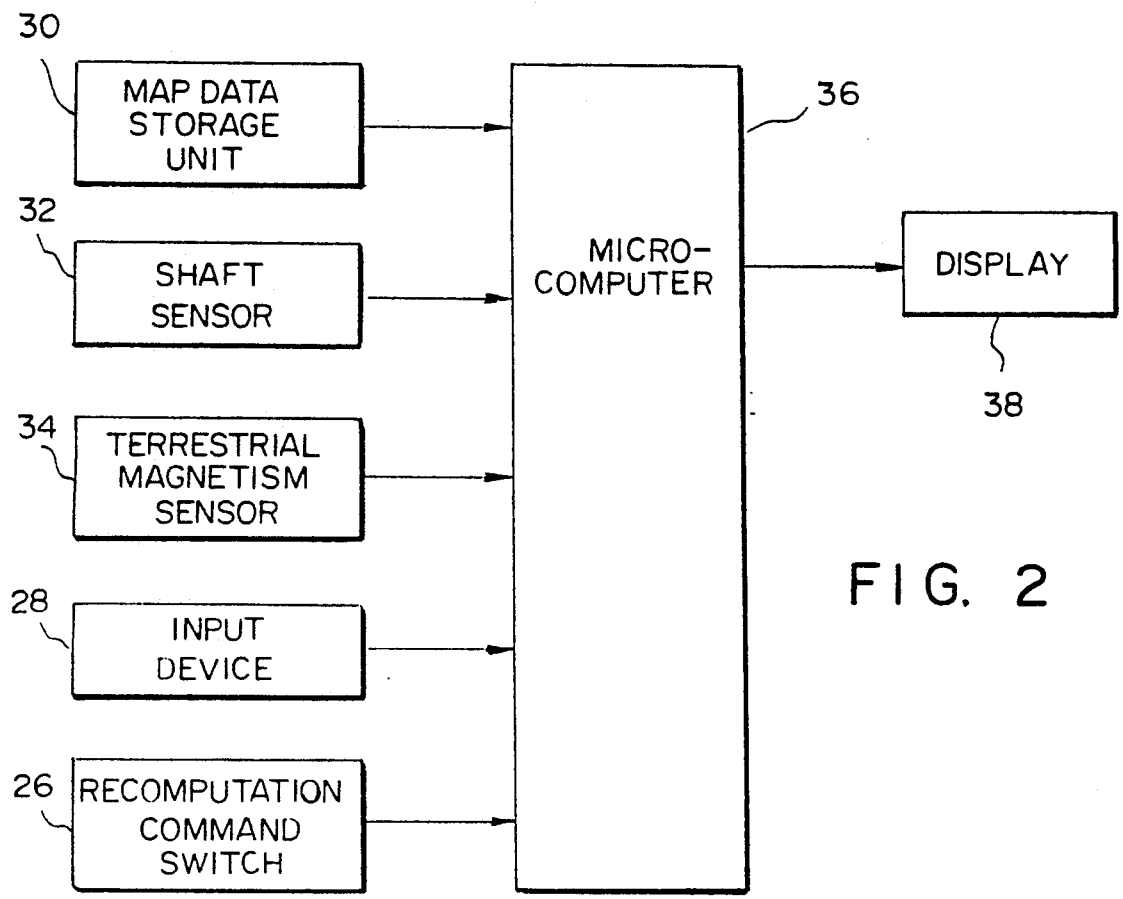
FIG. 2 is a block diagram of an embodiment of the present invention.

Referring to FIG. 2, a driver of vehicle 10 initiates computation of an optimal route in navigation system 24 by energizing a recomputation command switch 26. Together with the instruction to compute, the driver enters route data through input device 28. This data always specifies a destination; it may or may not specify a starting location. From two inputs: map data, retrieved from a map data storage unit 30, and either present location data, communicated from a distance sensor 32 and a terrestrial magnetism sensor 34, or a specified starting location, entered by the driver into input device 28, a microcomputer 36 computes the optimal route. Microcomputer 36 also computes guidance for following the optimal route. The guidance is sent to display 38 for presentation to the driver.

Map data storage unit 30 may be comprised of a CD-ROM or an IC card with map data written thereon, the map data including road network data and address data. Distance sensor 32 communicates signals that correspond to a rotation speed of a shaft. Terrestrial magnetism sensor 34 detects the direction of the terrestrial magnetic field. Microcomputer 36 computes distance travelled by vehicle 10 based on signals from distance sensor 32 and a forward direction of vehicle 10 computed from signals from terrestrial magnetism sensor 34. Display 38 is comprised of a CRT or other means for displaying data from microcomputer 36.

Figure 3A:
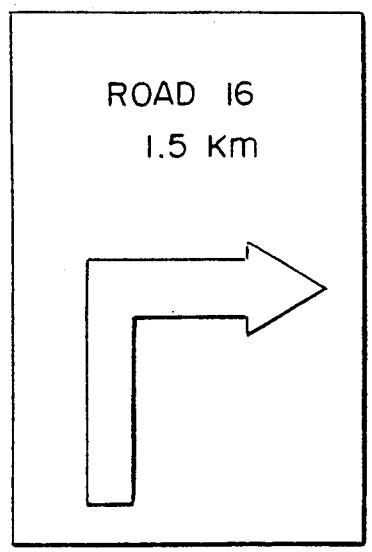
FIG. 3(A) is an example of local navigation guidance.
Figure 3B:
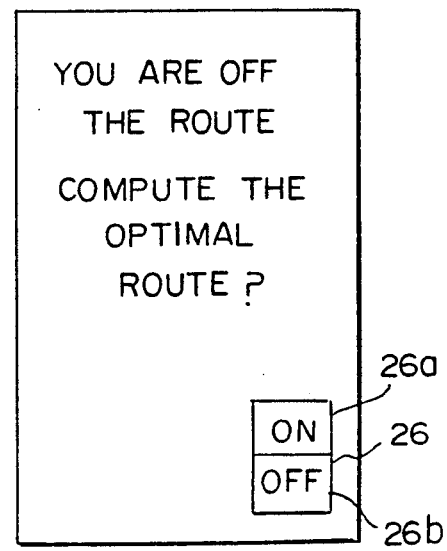
FIG. 3(B) is an example of information that shows that a vehicle is off the optimal route.

As shown in FIG. 3(B), recomputation command switch 26 consists of ON switch 26a and OFF switch 26b provided in the form of touch-sensitive keys on the screen of display 38.

The present location of vehicle 10 may also be computed from GPSS (Global Positioning System with Satellite) using three or four satellites.

Microcomputer 36 also computes, based on map data from map data storage unit 30, the optimal route from a starting point to a destination. The optimal route is computed to minimize the time or the distance from a starting point to a destination or to require the fewest number of right and left turns.

A starting point may be entered from input device 28. However, in this embodiment the present location of vehicle 10, or a geographic point whose relation to the present location is determined in the manner described below, is vehicle 10's starting point. Of course, the destination of vehicle 10 is entered through input device 28.

Microcomputer 36 computes route information for an optimal route and sends the information to display 38. Display 38 then presents the information as an image on the screen. In this application, route information means information necessary to guide vehicle 10 from its starting point to its destination along an optimal route. In the present embodiment, route information to be displayed comprises, as shown in FIG. 3(A), the name of the road to which vehicle 10 should proceed immediately it leaves the road currently traversed (e.g., Road 16 as in FIG. 3(A)), a distance between vehicle 10's present location and the next road (e.g., 1.5 km.), and an arrow representing the direction to take to turn into the next road. Route information is continuously recomputed and updated from the present location of vehicle 10 as it travels. Under normal conditions, an image on display 38 is updated immediately after vehicle 10 proceeds into the road whose name has just been displayed.

Local navigation guidance is thus presented from vehicle 10's starting point to the destination by repeating the above procedure. However, display of the distance from the present location of vehicle 10 to the next road is updated only at specified intervals, for example, every 500 m, according to the present embodiment.

Further, route information need not be limited to a road name, a distance, and an arrow, as shown in FIG. 3(A). It may include other information in addition thereto, or it may instead comprise entirely different information. The display may be voice instead of image, or voice and image may be jointly presented.

Microcomputer 36 also determines, based on vehicle 10's present location and its present optimal route, whether vehicle 10 is on or off the optimal route.

Figure 4:
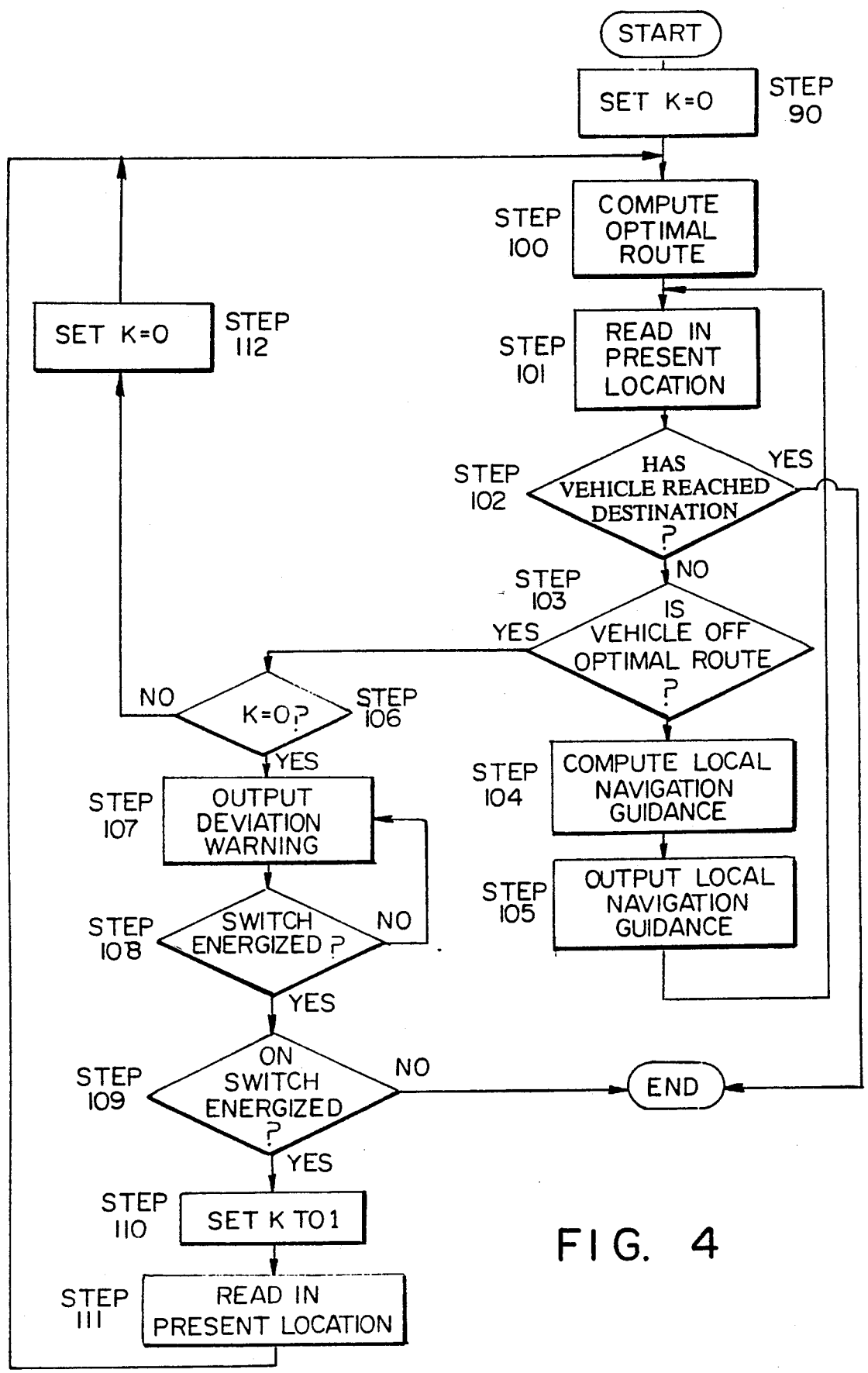
FIG. 4 is a flow chart illustrating the steps of computing local navigational guidance.

Referring to FIG. 4, the program begins when ON switch 26a is turned on after vehicle 10's starting point and destination have been entered through input device 28. When the program begins, k is set equal to a zero (Step 90), and the optimal route is computed (Step 100). Then vehicle 10's present location is read in (Step 101). Next a decision is made whether vehicle 10 has reached the destination (Step 102), in other words, whether vehicle 10's present location corresponds to the destination. If they correspond, the program ends.

Should vehicle not yet be at the destination, a decision is made whether or not vehicle 10 is off the optimal route (Step 103). If vehicle 10 is on the optimal route, local navigational guidance is computed (Step 104) and sent to display 38 to be displayed thereon (Step 105). Then the program returns to Step 101.

On the other hand, should it be decided in Step 103 that vehicle 10 is off the optimal route, a decision is made whether or not the value in a memory K within microcomputer 36 is 0 (Step 106). Since K is initially set equal to 0, the decision of Step 106 is affirmative for the first iteration after vehicle 10's departure for its destination, i.e., K=0 following the initial iteration.

In cases where Step 106 yields K≠0, in other words, beginning with the first deviation, information indicating the deviation is sent to display 38 (Step 107) to be displayed on the screen. The messages that indicate deviation are already stored in the internal memory of microcomputer 36 when vehicle 10 starts a journey. According to the present embodiment, a message suggesting recomputation of the optimal route is also displayed, that is, the message "You are off the route. Recompute the optimal route?" is displayed, as shown in FIG. 3(B).

Next a decision is made whether either section, ON switch 26a or OFF switch 26b, of recomputation command switch 26 has been activated (Step 108). If neither section of switch 26 has been activated, the decision step (Step 108) is repeated. If either section of switch 26 has been activated, a decision is made whether ON switch 26a of recomputation command switch 26 has been activated (Step 109).

Where OFF switch 26b has been activated rather than ON switch 26a, the program ends, thereby terminating the navigational guidance.

Where ON switch 26a has been activated, the value "1" is read into memory K (Step 110), and the present location of vehicle 10 is read (Step 111). Then the program returns to Step 100, where the optimal route from the new starting point to the destination is computed, with the present location of vehicle 10 becoming the new starting point.

Following the computation of the new optimal route, Steps 101 and 102 are executed, and whether vehicle 10 is off the new optimal route is decided in Step 103. If vehicle 10 is on the new route, Steps 104 and 105 are executed. In other words, normal navigational guidance is determined for the new optimal route.

Should vehicle 10 be determined to be off the optimal route in Step 103, in other words, if vehicle 10 is off the optimal route for the second time, the program repeats Step 106. At this time, however, the result of the decision is negative, i.e., K≠0, because the value "1" has already been written into K in Step 110. So the program proceeds to Step 112, where value "0" is written into memory K. Then the optimal route is recomputed again in Step 100.

According to the present embodiment, the value "0" is written into memory K in Step 112 when a vehicle has deviated for the second time. Therefore, should deviation occur for the third time, Steps 107 through 111 are again carried out, requiring manual operation in order to recompute the optimal route. By eliminating Step 112, however, it is possible to automatically repeat computation of an optimal route until vehicle 10 drives onto the optimal route.

In summary, data from distance sensor 32 and terrestrial magnetism sensor 34 are processed by microcomputer 36 to determine vehicle 10's present location. Microcomputer 36 also computes an optimal route from a starting point to a destination from map data in map data storage unit 30. In accordance with the vehicle's present location and the optimal route, microcomputer 36 determines whether vehicle 10 is on or off the optimal route, in other words, whether there has been a deviation.

Microcomputer 36 also determines whether a deviation is the first or follows a recomputation of the optimal route commanded by recomputation command switch 26. When the present deviation is determined to be the first, display 38 displays information indicating that vehicle 10 is off the optimal route.

When the driver of vehicle 10, having seen the information on display 38, turns on recomputation command switch 26, microcomputer 36 computes the new optimal route from the new starting point to the destination from map data retrieved from map data storage unit 30. At the time of this recomputation, the present location of vehicle 10 becomes the new starting point.

In cases where microcomputer 36 determines that the present deviation was detected after recomputation of the optimal route, microcomputer 36 computes the new optimal route from the new starting point to the destination from map data, again using vehicle 10's present location as the new starting point.

As explained above, according to a navigation system of the present invention, whenever navigation system 24 detects deviation from an optimal route, it determines whether this is the first deviation on the present journey. Should the deviation have occurred after recomputation of a new optimal route in response to operation of recomputation command switch 26, the new optimal route is automatically recomputed. Therefore the driver of vehicle 10 need not bear the burden of repeated manual operations to recompute the optimal route.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A vehicle navigation system, which comprises:
   means for storing and retrieving map data;
   first means for detecting a present location of a vehicle;
   means for computing from said map data an optimal route for said vehicle from a starting point to a destination;
   said means for computing including means for computing local navigation guidance from said map data;
   second means for detecting deviation of a position of said vehicle from said optimal route;
   first means for determining whether said deviation is a first deviation;
   second means for determining whether said deviation is a deviation subsequent to said first deviation;
   third means for determining whether said deviation is a deviation subsequent to a recomputation of said optimal route;
   means for displaying that said vehicle has deviated from said optimal route;

said means for displaying including means for displaying said local navigation guidance when said first means for determining determines that said deviation is said first deviation;

means for commanding a recomputation from said map data of a new optimal route from a new starting point to said destination;

said new starting point being a new present location as detected by said first means for detecting; and means for automatically computing, from said map data, said new optimal route from said new starting point to said destination, using, as said new starting point, said new present location as detected by said first means for detecting, when said third means for determining determines that a new deviation has been detected after a command from said means for commanding has caused recomputation of a previous optimal route.

2. A vehicle navigation system according to claim 1, wherein said means for storing and retrieving includes a remote computer database.

3. A vehicle navigation system according to claim 1, wherein said means for computing includes a microcomputer.

4. A vehicle navigation system according to claim 1, wherein said first means for detecting includes in combination a distance sensor and a terrestrial magnetism sensor.

5. A vehicle navigation system according to claim 1, wherein said second means for detecting includes in combination a distance sensor, a terrestrial magnetism sensor, and a microcomputer.

6. A vehicle navigation system according to claim 1, wherein said means for commanding includes a touch screen switch.

7. A vehicle navigation system according to claim 1, wherein said first means for determining includes a microcomputer.

8. A vehicle navigation system according to claim 1, wherein said second means for determining includes a microcomputer.

9. A vehicle navigation system according to claim 1, wherein said third means for determining includes a microcomputer.

10. A vehicle navigation system according to claim 1, wherein said means for displaying includes a CRT.

11. A vehicle navigation system according to claim 1, wherein said means for displaying includes a LCD.

12. A vehicle navigation system, which comprises:

a CD ROM for storing and retrieving a plurality of map data;

a distance sensor;

a terrestrial magnetism sensor;

said distance sensor and said terrestrial magnetism sensor sending signals that make it possible to detect a present location of a vehicle;

a microcomputer for computing from said map data an original optimal route for said vehicle from a starting point to a destination;

said microcomputer effective to compute local navigation guidance from said map data;

said microcomputer being effective to detect from said signals a deviation of said vehicle from said original optimal route;

said microcomputer including means for determining whether said deviation is a first deviation;

said microcomputer further including means for determining whether said deviation is a second deviation subsequent to a recomputation of said original optimal route;

a CRT display effective to convey information that said vehicle has deviated from said original optimal route when said microcomputer determines that said deviation is said first deviation;

said CRT display further effective to display said local navigation guidance;

a manually operated recomputation command switch for commanding computation of said original optimal route or a new optimal route;

said recomputation command switch being effective to command said microcomputer to compute, from said map data, said new optimal route from a new starting point to said destination;

said new starting point being a new present location as detected from said signals sent to said microcomputer from said distance sensor and said terrestrial magnetism sensor; and when said microcomputer determines that said second deviation has been detected after a command from said recomputation command switch has caused recomputation of a previous optimal route, said microcomputer automatically computes, from said map data, said new optimal route from said new starting point to said destination.

* * * * *